(12) United States Patent
McCloskey et al.

(10) Patent No.: US 9,342,724 B2
(45) Date of Patent: May 17, 2016

(54) VARIABLE DEPTH OF FIELD BARCODE SCANNER

(71) Applicant: Honeywell International Inc., Morristown, NJ (US)

(72) Inventors: Scott McCloskey, Minneapolis, MN (US); Matthew Edward Lewis Jungwirth, Golden Valley, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 14/483,056

(22) Filed: Sep. 10, 2014

(65) Prior Publication Data
US 2016/0070944 A1    Mar. 10, 2016

(51) Int. Cl.
*G06K 7/10*    (2006.01)
*G06K 7/14*    (2006.01)

(52) U.S. Cl.
CPC ........ *G06K 7/10831* (2013.01); *G06K 7/10752* (2013.01); *G06K 7/146* (2013.01)

(58) Field of Classification Search
CPC . G06K 7/14; G06K 7/10851; G06K 7/10722; G06K 7/10881; G06K 7/10811; G06K 7/10702; G06K 7/10693; G06K 2207/1011
USPC ............... 235/462.01, 462.06, 462.2, 462.21, 235/462.22, 462.23, 462.32
See application file for complete search history.

(56) References Cited

U.S. PATENT DOCUMENTS

| | | | |
|---|---|---|---|
| 5,408,103 A | 4/1995 | Peng | |
| 7,793,840 B2 * | 9/2010 | Vinogradov | .................. 235/454 |
| 2006/0132639 A1 | 6/2006 | Page | |
| 2006/0171041 A1 | 8/2006 | Olmstead et al. | |
| 2010/0073518 A1 | 3/2010 | Yeh | |
| 2010/0147955 A1 | 6/2010 | Dvorkis et al. | |
| 2010/0245602 A1 | 9/2010 | Webster et al. | |
| 2010/0294839 A1 * | 11/2010 | Kawashima et al. | ......... 235/455 |
| 2012/0118974 A1 | 5/2012 | Germaine et al. | |
| 2012/0154924 A1 | 6/2012 | Lee et al. | |
| 2013/0126615 A1 | 5/2013 | McCloskey et al. | |
| 2014/0239073 A1 | 8/2014 | Toyoda et al. | |

OTHER PUBLICATIONS

Miau, Daniel, et al., "Focal Sweep Videography with Deformable Optics", IEEE International Conference on Computational Photography (ICCP), (2013), 8 pgs.
Search Report in counterpart European Application No. 15183916.4 dated Jan. 21, 2016, pp. 1-10.

* cited by examiner

*Primary Examiner* — Karl D Frech
(74) *Attorney, Agent, or Firm* — Additon, Higgins & Pendleton, P.A.

(57) ABSTRACT

Generally discussed herein are techniques, software, apparatuses, and systems configured for variable depth of field scanners. In one or more embodiments, a method can include exposing a light sensor of a barcode scanner for a specified time, altering a focal point of a variable focus element situated in the light path of the light sensor from a first focal point to a second focal point in the specified time, and processing an image of a barcode produced by the light sensor to deblur the image.

20 Claims, 5 Drawing Sheets

VARIABLE DEPTH OF FIELD BARCODE SCANNER

BACKGROUND

A barcode is a machine-decodable optical representation of data. In one or more embodiments, a barcode represents data related to an object that the barcode is situated on. A one dimensional barcode includes parallel lines of varying widths and spaces. A portion of a line or space of a specific width can be considered a module (a fundamental shape that can represent a single piece of data). A two dimensional barcode can include a fundamental shape (a module) arranged in a matrix or a grid pattern. Some barcodes can include data encoded in only a module (a bar or fundamental shape), and other barcodes can include data encoded in the modules and a space between the modules. The data the barcode represents can be determined by decoding the arrangement of the modules and translating the pattern of fundamental shapes using a symbology. The symbology specifies the encoding of the fundamental patterns and their relation to a character (e.g., a digit).

SUMMARY

In one or more embodiments, a barcode scanner can include a photo detector, a variable focus element situated such that light incident on the photo detector passes through the variable focus element, and a processor coupled to the photo detector to process an image of a barcode captured by the photo detector to at least partially deblur the image.

In one or more embodiments, a method can include exposing a light sensor of a barcode scanner for a specified time, altering a focal point of a variable focus element situated in the light path of the light sensor from a first focal point to a second focal point in the specified time, and processing an image of a barcode produced by the light sensor to deblur the image.

In one or more embodiments, a non-transitory computer readable medium includes instructions stored thereon, which when executed by a machine, configure the machine to perform operations comprising exposing a light sensor for a specified time, altering a focal point of a variable focus element situated in the light path of the light sensor from a first focal point to a second focal point in the specified time, and processing an image of a barcode produced by the photo detector to deblur the image.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
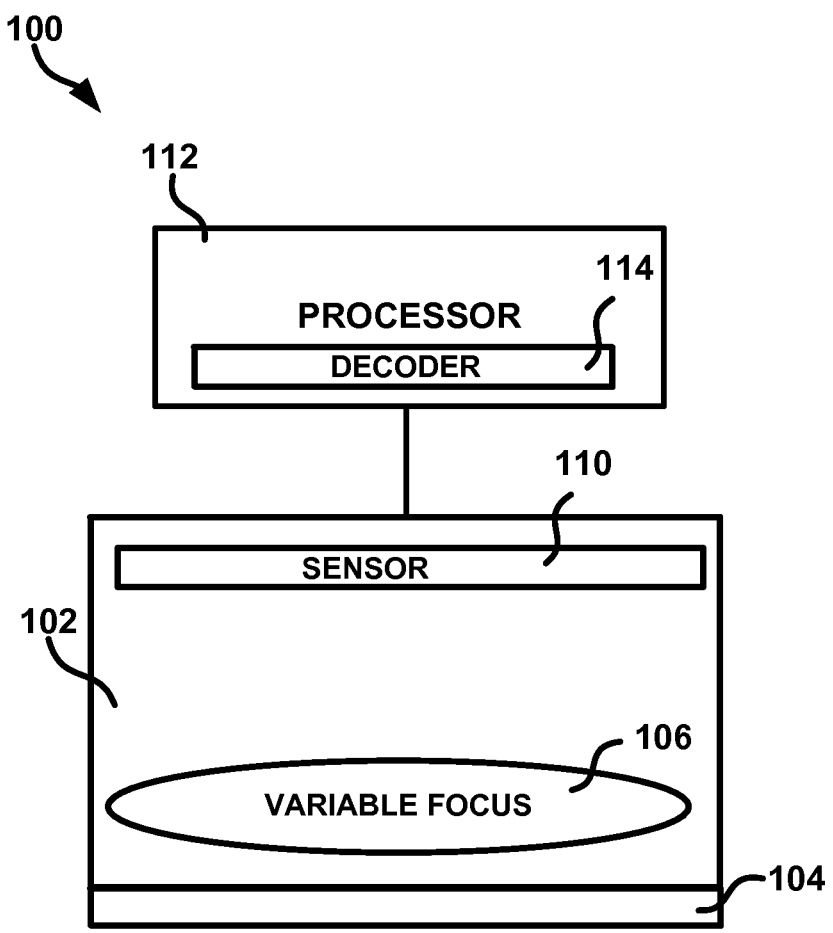
FIG. 1 illustrates a block diagram of an example of a two-dimensional barcode scan system, in accord with one or more embodiments.

While embodiments of this disclosure can take many different forms, specific embodiments thereof are shown in the drawings and will be described herein in detail with the understanding that the present disclosure is to be considered as embodiments of the principles of the disclosure, as well as the best mode of practicing the same, and is not intended to limit the disclosure to the specific embodiments illustrated.

A barcode scanner is generally limited in the depth of field over which it can properly scan a barcode. While some of this limitation can be due to spatial resolution (i.e., an inability to resolve a fundamental shape at distance), some of this limitation is due to optical blur. At least some barcode scanners have fixed-focus optics, due to issues with the mechanical complexity, robustness, shutter lag, or the cost of including a variable focus element in a barcode scanner.

In a standard optical arrangement, fixed shape lenses can move along the camera's optical axis. In one or more embodiments, a barcode scanner can incorporate variable focus components, where the shape of a particular lens (in a fixed position along the optical axis) is modified to implement focusing. For such systems, focus control and how to coordinate changes in focal position with image capture and decoding can be difficult, and can introduce an unacceptable shutter lag between triggering an image capture and actual image capture.

One way to coordinate variable focus with image capture is to add a depth sensing element which determines the distance to the barcode, and adjusts the focus element to produce a focused image of that depth in the scene. This may add a cost that is too prohibitive to be marketable.

Another option is to continuously vary the focus element to sweep through a range of scene depths, and to capture a series of images in the process. In order to avoid artifacts, the change of the lens must be minimized during the exposure of each image. This exacerbates the system lag in low light situations, as any increase in exposure time is multiplied by the number of the images captured.

In one or more embodiments, a single image is captured during which a focus element passes through several focal states (e.g., from a first focal point to a second focal point, such as by monotonically increasing or decreasing the focal point from the first focal point to the second focal point. Such an embodiment may not include a depth sensor. The use of a single image decreases the computational load because there is only a single image on which to attempt decoding. Because the lens changes focal position during exposure, the raw image will be blurred. However, for barcodes within a certain range of depths (larger than the depth of field associated with any particular focal position), the blur Point Spread Function (PSF) can be approximately the same. Thus, the raw image can be de-blurred with an inverse PSF that can be calculated a priori, and no blur estimation may be required in one or more embodiments.

Reference will now be made to the FIGS. to further describe details of embodiments of the disclosure.

FIG. 1 shows an example of a barcode scanner system 100, in accord with one or more embodiments. The system 100 can include a barcode scanner 102 and a processing module 112. While the processing module 112 is shown as separate from the barcode scanner 102, the processing module 112 can be included as part of the barcode scanner 102. The barcode scanner 102 of FIG. 1 can image or decode one-dimensional and two-dimensional barcodes.

The barcode scanner 102 can be a two-dimensional barcode scanner. The barcode scanner 102 can include a cover 104, a variable focus element 106, or a sensor 110. The cover 104 can help protect items of the barcode scanner 102 from external elements.

Figure 2:
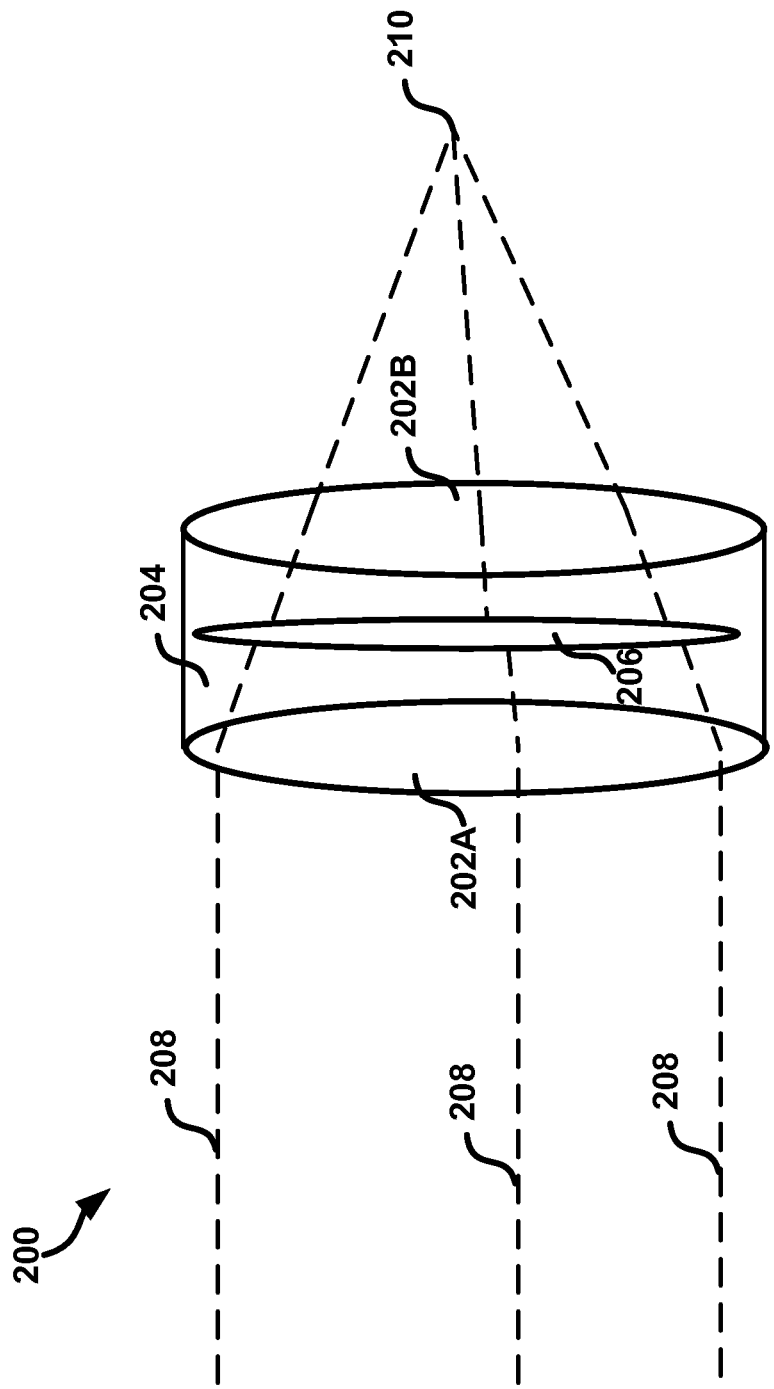
FIG. 2 illustrates a block diagram of an example of a deformable lens and a sensor, in accord with one or more embodiments.

The variable focus element 106 is depicted as internal to the barcode scanner 102, but can be an attachment, or otherwise external, to the barcode scanner 102. An embodiment of the variable focus element 106 is depicted in FIG. 2. The variable focus element 106 can include one or more focusing elements (e.g., lenses). The variable focus element 106 can include one or more zoom lenses or a varifocal lens, among other mechanical focus elements. The variable focus element 106 can include a deformable lens that can be configured (e.g., by changing the shape or size of the deformable) to have a variety of focal points. The variable focus element 106 can include a glass, plastic, polymer, or other at least partially transparent element that alters the path of light incident thereon, such as to help focus the incident light. The variable focus element 106 can include an optical fluid between transmissive (e.g., at least partially transparent) plates. A size or shape of a bubble in the optical fluid can be controlled and the size or shape of the bubble can alter the focal point of the variable focus element 106. The size or shape of the bubble can be altered by altering a magnitude of an electric field applied to the optical fluid. The optical fluid and transmissive plates can include a variety of indexes of refraction. The variable focus element 106 can be coupled to the processing module 112. The processing module 112 can control a magnitude of an electric field applied to the variable focus element 106, such as to control a focal point of the variable focus element 106. In an embodiment that includes a mechanical variable focus element, the variable focus element 106 can be adjusted manually or electro-mechanically from a first focal point to a second focal point.

The sensor 110 value can be cleared electronically when an image is to be captured. At the end of a specified time (e.g., when the variable focus element has completed its transition from a first focal point to a second focal point) the value determined by the sensor 110 can be read, such as by the processing module 112. In this fashion, the exposure time of the sensor 110 can be controlled. The exposure time can be based on the depth of field of the barcode scanner 102. The exposure time can be sufficient to change the focal point of the variable focus element 106 from a first point to a second point located at a distance from the first point, such as to traverse the entire depth of field or just a portion of the depth of field of the barcode scanner.

The sensor 110 can convert an optical ray(s) (e.g., a photon) into an electronic signal. The sensor 110 can include a Charge-Coupled Device (CCD) or an active pixel sensor. The CCD or active pixel sensor can be implemented us Metal Oxide Semiconductor (MOS) technology, such as Complimentary MOS (CMOS), N-Type MOS (NMOS) or Live MOS, among others. The sensor 110 can be a photo detector or light sensor. The sensor 110 can be coupled to the processing module 112, such that image data from the sensor 110 can be communicated to the processing module 112.

The processing module 112 can receive electrical signals from the sensor 110 and perform an operation on the signals, such as to help deblur an image represented by the electrical signals. The processing module 112 can de-convolve the PSF from the image, such as to help deblur the image. The PSF can be determined by capturing an image of a reference object a priori, and determining the PSF based on the captured image.

The reference image can include a spot (e.g., point source) of light (e.g., a laser spot) in a reference scene. The image that is captured can be captured using the same operating conditions (e.g., time of exposure, starting and ending focal points of the variable focus element 106, etc.) that will be used when the barcode scanner 102 is used in the field (e.g., while altering the focus of the variable focus element from a first focal point to a second focal point). The processing module 112 can deconvolve the image created by the sensor 108.

An image, I, captured by the sensor 110 can be described as a convolution of a sharp image, J, and a PSF, B (e.g., I=B*J, where * denotes convolution). Given I and B (or at least an estimate of B), the image J can be estimated, such as by de-convolving the PSF from the image. In an example where a reference image is a point light source, the PSF, B, is the same as the image, I (i.e. B=I).

The PSF can be measured by imaging a point source from some distance to the optical system's image plane. The PSF can be different for a different distance from the optical system's image plane. When using a point source, the image is equal to the PSF. The PSF can be an array (two or one-dimensional array) of pixel values. Care can be taken to center the image on the array, such as to avoid Fourier shifts.

A 'point source' to a system is an object whose paraxial image is smaller than the Rayleigh resolution, defined as $D=2.44*\lambda*F_{\#}$, where D is the diameter of the smallest resolved spot, $\lambda$ is the wavelength, and $F_{\#}$ is the system f-number. Then, using the object diameter and resolution, the distance between the optical system image plane and the object can be determined.

Decoding a PSF can be described using general transfer function theory. An analysis is presented in one-dimension. The image, I, is as described herein. Determining the PSF, B, can be easier to perform in the frequency domain. Let F(X), be the frequency domain representation of the function X so that F[I=B*J] is F(I)=F(B)F(J) and $F(J)=F^{-1}(B)F(I)$. The inverse PSF can be determined using a matrix inversion technique. The function F(J) can be transferred to the time domain space to yield the de-convolved image.

The PSF of an imaging system can be dependent on a distance between the imaging system and an object to be imaged (e.g., the amount of blur imaged can be dependent on a focal point of the imaging system or a distance between an item (e.g., lens or photo detector) of the imaging system and the focal point). The scanner 100 can be configured to sweep the focal point of the variable focus element 106 from a first focal point to a second focal point while exposing the sensor 110 to light incident thereon. A variety of PSFs can be applied to the image created, where each PSF corresponds to a different focal point of the variable focus element 106 and a corresponding distance between the variable focus element 106 and the object being imaged. The images created thereby can be compared and one or more of the images can be used in decoding (e.g., the sharpest image created can be used for decoding). Such a system can be useful in circumstances in which a distance between the object to be imaged and the scanner 100 (or an item of the scanner 100) is unknown. Such a system can create a sharp image to be decoded, such as in circumstances where the object resides somewhere at, near, or between the first focal point and the second focal of the variable focus element 106. Such as system can allow a scanner to remain stationary and capture sharp images of objects at different distances from the scanner.

The processing module 112 can include a decoder 114. The decoder 114 can extract data from an image of a barcode imaged using the barcode scanner 102. The decoder 114 can extract the contents of the imaged code, such as by interpreting the data represented by the imaged symbology.

There are a variety of two-dimensional (2D) barcode symbologies including a Quick Reference (QR) code, a stacked symbology that repeats a given linear symbology vertically, Aztec code, Code 1, ColorCode, Color Construct Code, CyberCode, d-touch, dataglyph, Data Matrix, Datastrip Code, digital paper, EZcode, High Capacity Color Barcode, HueCode, InterCode, MaxiCode, MMCC, NexCode, Nintendo e-Reader#dot code, PDF 417, Qode, ShotCode, or a SPARQCode.

FIG. 2 shows an example of a variable focus element 200, in accord with one or more embodiments. The variable focus element 200 can include transmissive plates 202A and 202B separated by an optical fluid 204. A bubble 206 can be present in the optical fluid 204. The size or shape of the bubble 206 can alter a focal point 210 of light 208 incident on the variable focus element 200. The size or shape of the bubble 206 can be altered by altering a magnitude of an electric field applied to the optical fluid 204. The variable focus element 106 can be similar to the variable focus element 200.

Figure 3:
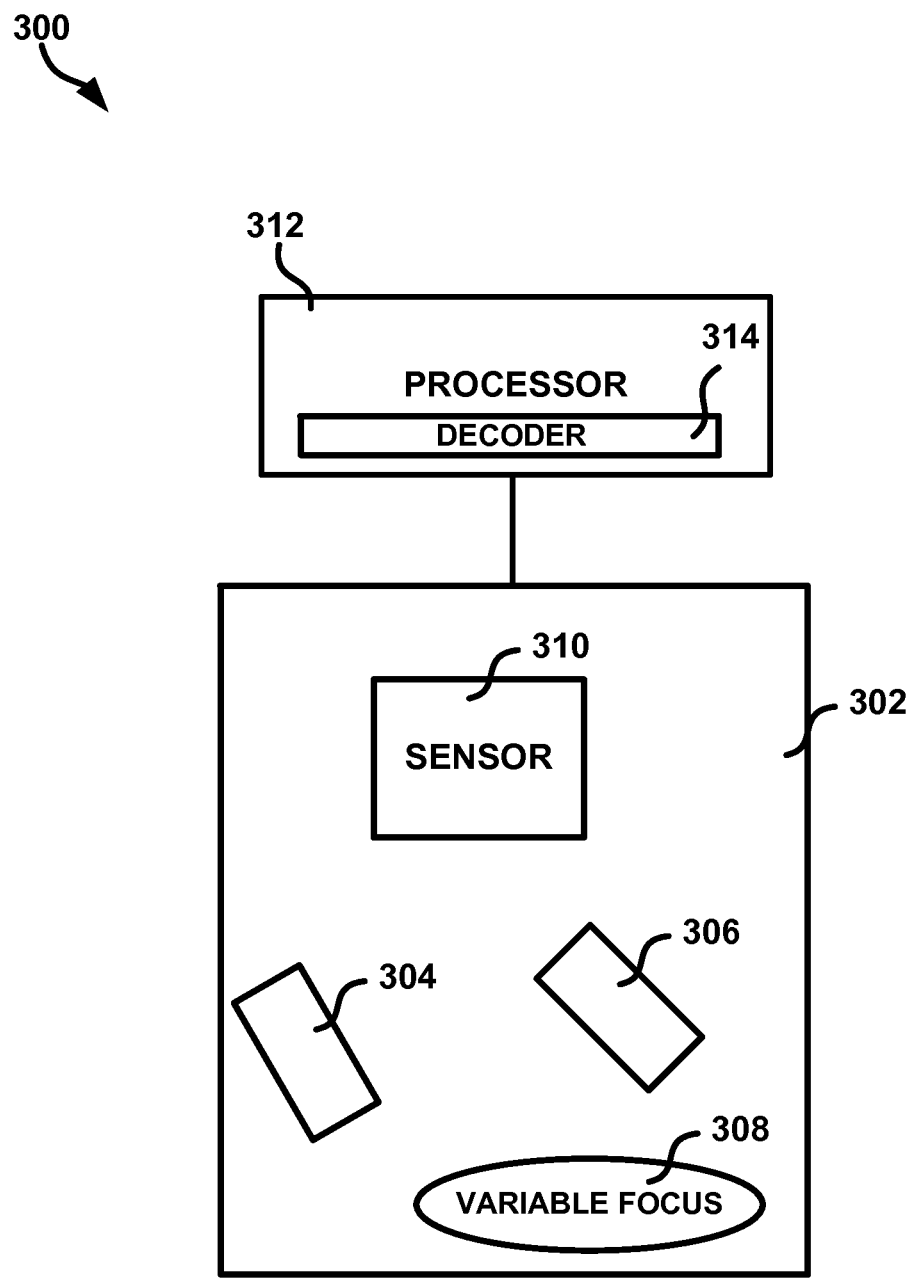
FIG. 3 illustrates a block diagram of an example of a one-dimensional barcode scan system, in accord with one or more embodiments.

FIG. 3 shows an example of a one-dimensional barcode scanner system 300, in accord with one or more embodiments. The one-dimensional barcode scanner system 300 can include a one-dimensional barcode scanner 302 and a processing module 112.

The barcode scanner 302 can include a light emitting element 304, an optional reflective surface 306, a variable focus element 308, and a sensor 310. The light emitting element 304 can include a laser, Light Emitting Diode, or other light emitting element. The light from the light emitting element 304 can be transmitted through the variable focus element 308. The light from the light emitting element 304 can be transmitted to the reflective surface 306. The reflective surface 306 can include a mirror. The reflective surface 306 can redirect light from the light emitting element 304 towards the variable focus element 308. The light emitting element 304 or the reflective surface 306 can be rotatable. By rotating the light emitting element 304 or the reflective surface 306, light from the light emitting element 304 can be incident on multiple points, such as to scan the light from the light emitting element 304 across a barcode.

The light from the light emitting element 304 can be incident on the variable focus element 308. The variable focus element 308 can change a dispersion of light incident thereon. The variable focus element 308 can include a configurable focal point, such as to provide a variable focus element 308 that can include a focal point at a first point, a second point, and a point there between, such as any or all points there between.

The sensor 310 can convert light incident thereon to an electrical pulse based on the intensity of the incident light. The sensor 310 can include one or more photodiodes, or an array of photodiodes, among others.

A processing module 312 can be similar to the processing module 112. A decoder 314 can be similar to the decoder 114.

There are a variety of one-dimensional barcode symbologies including Universal Product Code (UPC), Codabar, Code 25 (Non-Interleaved/Interleaved 2 of 5), Code 11, Code 39, Code 128, CPC Binary, DUN 14, EAN 2, EAN 3, EAN 5, EAN 8, EAN 13, Facing Identification Mark, GS1-128, GS1 DataBar, HIBC/HIBCC, Intelligent Mail barcode, ITF-14, JAN, KarTrak ACI, Latent Image code, MSI, Pharmacode, PLANET, Plessy, PostBar, POSTNET, RM4SCC/KIX, and Telepen.

Figure 4:
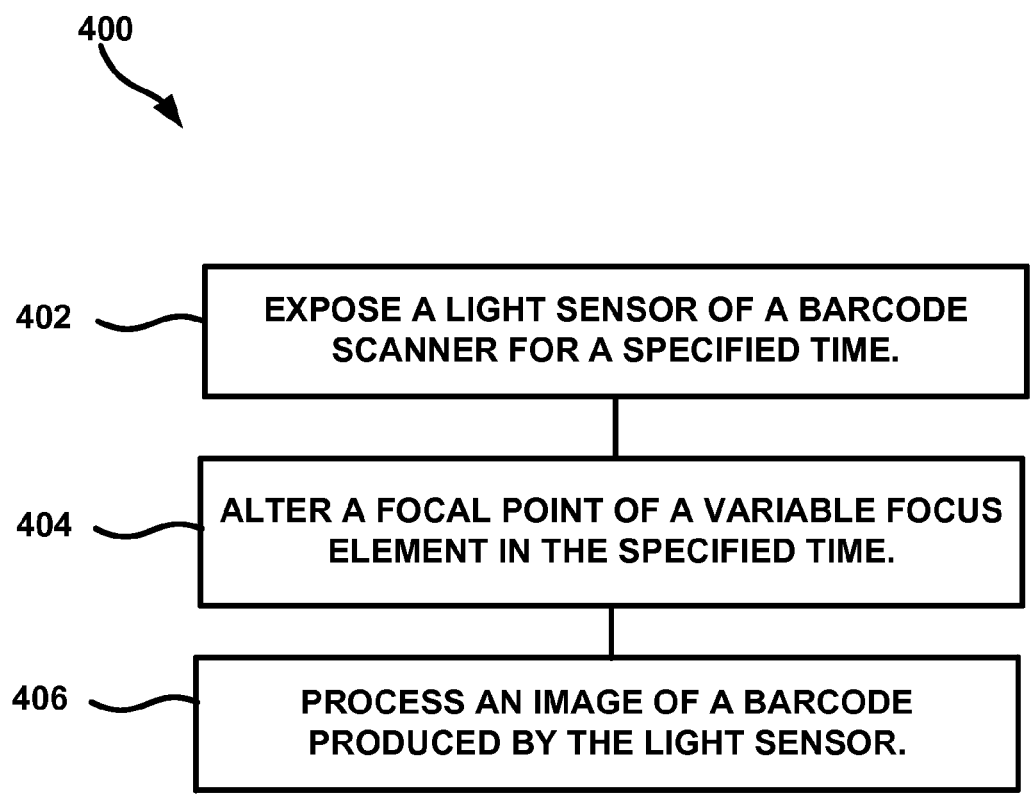
FIG. 4 illustrates a flow diagram of an example of a technique, in accord with one or more embodiments.

FIG. 4 shows a flow diagram of an example of a method 400, in accord with one or more embodiments. The method 400 as illustrated includes: exposing a light sensor of a barcode scanner for a specified time, at operation 402; altering a focal point of a variable focus element from a first focal point to a second focal point, at operation 404; and processing an image of a barcode produced by the light sensor, at operation 406. The variable focus element can be situated in the light path of the light sensor. The operation at 406 can at least partially deblur the image.

The operation at 404 can include altering the focal point of the variable focus element from a first focal point to a second point. The operation at 404 can include altering the focal point of the variable focus element includes monotonically changing the focal point of the variable focus element by changing an electric field applied to the variable focus element. The operation at 406 can include de-convolving a point spread function from the image.

The method 400 can include decoding the barcode to extract data embedded in the barcode. The method 400 can include determining the point spread function associated with the image, wherein determining the point spread function includes exposing a reference scene to a laser light source and determining the point spread function based on an image produced therefrom. The point spread function is associated with altering the focal point of the variable focus element from the first focal point to the second focal point. Determining the point spread function includes determining a plurality of point spread functions, each point spread function associated with a different distance between the variable focus element and the barcode. De-convolving the point spread function from the image can include de-convolving the image a plurality of times, each time using a different point spread function of the plurality of point spread functions. In this manner, an image focused at a first focal plane in a field of view and an image focused in a second focal plane in the field of view can be produced. Such an embodiment can be helpful in situations where a distance to an object to be imaged is variable or unknown, such as when an image of a barcode is captured using a device, such as a handheld device.

The method 400 can include determining which image of the plurality of de-convolved images is sharpest before decoding the image.

Figure 5:
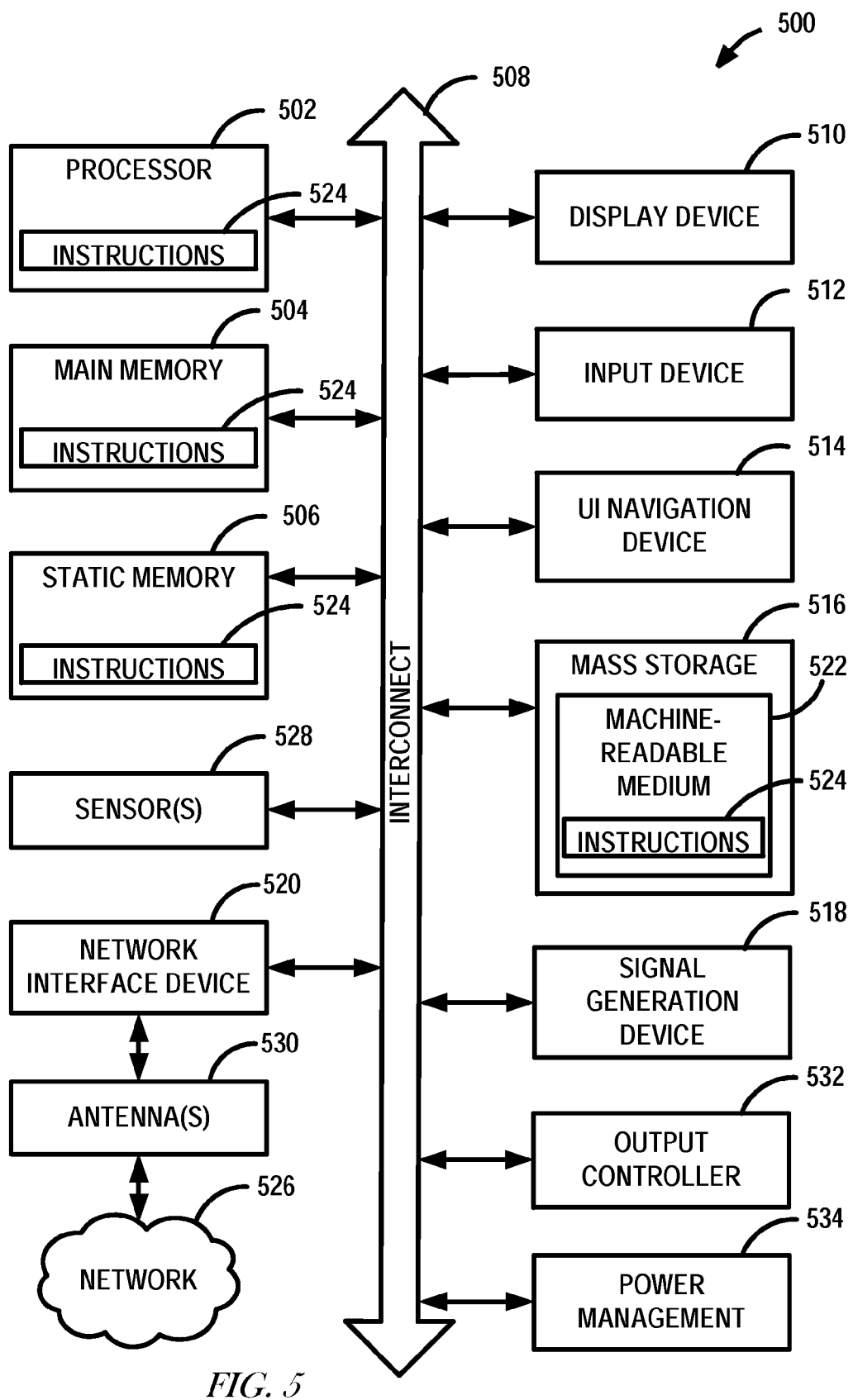
FIG. 5 illustrates a block diagram of an example of a computing device system, in accord with one or more embodiments.

FIG. 5 is a block diagram illustrating an example computer system machine upon which any one or more of the techniques herein discussed can be run. In one or more embodiments, the processing module 112 or 312 or the barcode scanner 102 or 302 can include one or more items of computer system 500. Computer system 500 can be embodied as a computing device, providing operations of the processing module 112 or 312 or the barcode scanner 102 or 302 or any other processing or computing platform or component described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine can be a personal computer (PC), such as a PC that can be portable (e.g., a notebook or a netbook) or a PC that is not conveniently portable (e.g., a desktop PC), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Implementing techniques using computer processors and other logic can lead to automated camera condition change detection (e.g., that does not include human interference).

Example computer system 500 can include a processor 502 (e.g., a central processing unit (CPU), a graphics processing unit (GPU) or both), a main memory 504 and a static memory 506, which communicate with each other via an interconnect 508 (e.g., a link, a bus, etc.). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system 500 can additionally include a storage device 516 (e.g., a drive unit), a signal generation device 518 (e.g., a speaker), an output controller 532, a power management controller 534, or a network interface device 520 (which can include or operably communicate with one or more antennas 530, transceivers, or other wireless communications hardware), or one or more sensors 528, such as a GPS sensor, compass, location sensor, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, or the processor 502 also constituting machine-readable media. The processor 502 configured to perform an operation can include configuring instructions of a memory or other machine-readable media coupled to the processor, which when executed by the processor, cause the processor 502 to perform the operation.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES AND EXAMPLES

The present subject matter can be described by way of several examples.

Example 1 can include or use subject matter (such as an apparatus, a method, a means for performing acts, or a device readable memory including instructions that, when performed by the device, can cause the device to perform acts), such as can include or use a photo detector, a variable focus element situated such that light incident on the photo detector passes through the variable focus element, and a processor coupled to the photo detector to process an image of a barcode captured by the photo detector to at least partially deblur the image.

Example 2 can include or use, or can optionally be combined with the subject matter of Example 1, to include or use wherein the processor controls a focal point of the variable focus element and alters the focal point of the variable focus element from a first focal point to a second focal point.

Example 3 can include or use, or can optionally be combined with the subject matter of at least one of Examples 1-2, to include or use, wherein altering the focal point of the variable focus element takes a specified amount of time, and wherein the processor controls an exposure time of the photo detector by clearing a value of the photo detector at the beginning of the specified time and reads the value of the photo detector at the end of the specified time.

Example 4 can include or use, or can optionally be combined with the subject matter of at least one of Examples 1-3, to include or use wherein the processor to process the image includes the processor to de-convolve the point spread function from the image, the point spread function associated with the focal point changing form the first focal point to the second focal point.

Example 5 can include or use, or can optionally be combined with the subject matter of at least one of Examples 1-4, to include or use, wherein the variable focus element includes an optical fluid between two transmissive plates with a bubble in the optical fluid.

Example 6 can include or use, or can optionally be combined with the subject matter of Example 5, to include or use, wherein the size of the bubble changes the focal point of variable focus element and the size of the bubble is changed by changing an electric field applied to the variable focus element.

Example 7 can include or use, or can optionally be combined with the subject matter of at least one of Examples 1-6, to include or use, wherein the processor is to control the electric field applied to the variable focus element to monotonically increase or decrease the focal point of the variable focus element from the first focal point to the second focal point.

Example 8 can include or use, or can optionally be combined with the subject matter of at least one of Examples 1-7, to include or use a decoder coupled to the processor to extract information embedded in the two-dimensional barcode.

Example 9 can include or use, or can optionally be combined with the subject matter of at least one of Examples 1-8, to include or use, wherein the processor computes a plurality of images, each image associated with a different distance between the barcode and the variable focus element and each image de-convolved based on the focal point of the variable focus element being about equal to the distance between the variable focus element and the barcode.

Example 10 can include or use subject matter (such as an apparatus, a method, a means for performing acts, or a device readable memory including instructions that, when performed by the device, can cause the device to perform acts), such as can include or use exposing a light sensor of a barcode scanner for a specified time, altering a focal point of a variable focus element situated in the light path of the light sensor from a first focal point to a second focal point in the specified time, and processing an image of a barcode produced by the light sensor to at least partially deblur the image.

Example 11 can include or use, or can optionally be combined with the subject matter of Example 10, to include or use, wherein altering the focal point of the variable focus element includes monotonically changing the focal point of the variable focus element by changing an electric field applied to the variable focus element.

Example 12 can include or use, or can optionally be combined with the subject matter of at least one of Examples 10-11, to include or use, wherein processing the image produced by the light sensor includes de-convolving a point spread function from the image.

Example 13 can include or use, or can optionally be combined with the subject matter of at least one of Examples 10-12, to include or use decoding the barcode to extract data embedded in the barcode.

Example 14 can include or use, or can optionally be combined with the subject matter of at least one of Examples 10-13, to include or use determining the point spread function associated with the image, wherein determining the point spread function includes exposing a reference scene to a laser light source and determining the point spread function based on an image produced therefrom.

Example 15 can include or use, or can optionally be combined with the subject matter of at least one of Examples 10-14, to include or use, wherein the point spread function is associated with altering the focal point of the variable focus element from the first focal point to the second focal point.

Example 16 can include or use, or can optionally be combined with the subject matter of at least one of Examples 10-15, to include or use, wherein determining the point spread function includes determining a plurality of point spread functions, each point spread function associated with a different distance between the variable focus element and the barcode, and wherein de-convolving the point spread function from the image includes de-convolving the image a plurality of times, each time using a different point spread function of the plurality of point spread functions.

Example 17 can include or use, or can optionally be combined with the subject matter of at least one of Examples 10-16, to include or use, determining which image of the plurality of de-convolved images is sharpest before decoding the image.

Example 18 can include or use subject matter (such as an apparatus, a method, a means for performing acts, or a device readable memory including instructions that, when performed by the device, can cause the device to perform acts), such as can include or use exposing a light sensor for a specified time, altering a focal point of a variable focus element situated in the light path of the light sensor from a first focal point to a second focal point in the specified time, and processing an image of a barcode produced by the photo detector to deblur the image.

Example 19 can include or use, or can optionally be combined with the subject matter of Example 18, to include or use determining a plurality of point spread functions, each point spread function associated with a different distance between the variable focus element and the barcode, and de-convolving the image a plurality of times, each time using a different point spread function of the plurality of point spread functions.

Example 20 can include or use, or can optionally be combined with the subject matter of Example 19, to include or use determining which image of the plurality of de-convolved images is sharpest before decoding the image.

Example 21 can include or use, or can optionally be combined with the subject matter of at least one of Examples 19-20, to include or use subject matter as recited in at least one of Examples 10-15.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in this document, the terms "first," "second," and "third," etc. are used merely as labels, and are not intended to impose numerical requirements on their objects.

From the foregoing, it will be observed that numerous variations and modifications can be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Although a few embodiments have been described in detail above, other modifications are possible. For example, the logic flows depicted in the FIGS. do not require the particular order shown, or sequential order, to achieve desirable results. Other steps can be provided, or steps can be eliminated, from the described flows, and other components can be added to, or removed from, the described systems. Other embodiments can be within the scope of the following claims.

The invention claimed is:

1. A barcode scanner comprising:
   a photo detector;
   a variable focus element situated such that light incident on the photo detector passes through the variable focus element; and
   a processor coupled to the photo detector to process an image of a barcode captured by the photo detector to at least partially deblur the image.

2. The barcode scanner of claim 1, wherein the processor controls a focal point of the variable focus element and alters the focal point of the variable focus element from a first focal point to a second focal point.

3. The barcode scanner of claim 1, wherein altering the focal point of the variable focus element takes a specified amount of time, and wherein the processor controls an exposure time of the photo detector by clearing a value of the photo detector at the beginning of the specified time and reads the value of the photo detector at the end of the specified time.

4. The barcode scanner of claim 3, wherein the processor to process the image includes the processor to de-convolve the point spread function from the image, the point spread function associated with the focal point changing form the first focal point to the second focal point.

5. The barcode scanner of claim 4, wherein the variable focus element includes an optical fluid between two transmissive plates with a bubble in the optical fluid.

6. The barcode scanner of claim 5, wherein the size of the bubble changes the focal point of variable focus element and the size of the bubble is changed by changing an electric field applied to the variable focus element.

7. The barcode scanner of claim 6, wherein the processor is to control the electric field applied to the variable focus element to monotonically increase or decrease the focal point of the variable focus element from the first focal point to the second focal point.

8. The barcode scanner of claim 7, further comprising a decoder coupled to the processor to extract information embedded in the two-dimensional barcode.

9. The barcode scanner of claim 8, wherein the processor computes a plurality of images, each image associated with a different distance between the barcode and the variable focus element and each image de-convolved based on the focal point of the variable focus element being about equal to the distance between the variable focus element and the barcode.

10. A method comprising:
exposing a light sensor of a barcode scanner for a specified time;
altering a focal point of a variable focus element situated in the light path of the light sensor from a first focal point to a second focal point in the specified time; and
processing an image of a barcode produced by the light sensor to deblur the image.

11. The method of claim 10, wherein altering the focal point of the variable focus element includes monotonically changing the focal point of the variable focus element by changing an electric field applied to the variable focus element.

12. The method of claim 11, wherein processing the image produced by the light sensor includes de-convolving a point spread function from the image.

13. The method claim 12, further comprising decoding the barcode to extract data embedded in the barcode.

14. The method of claim 13, further comprising determining the point spread function associated with the image, wherein determining the point spread function includes exposing a reference scene to a laser light source and determining the point spread function based on an image produced therefrom.

15. The method of claim 14, wherein the point spread function is associated with altering the focal point of the variable focus element from the first focal point to the second focal point.

16. The method of claim 14, wherein determining the point spread function includes determining a plurality of point spread functions, each point spread function associated with a different distance between the variable focus element and the barcode, and wherein de-convolving the point spread function from the image includes de-convolving the image a plurality of times, each time using a different point spread function of the plurality of point spread functions.

17. The method of claim 16, further comprising determining which image of the plurality of de-convolved images is sharpest before decoding the image.

18. A non-transitory computer readable medium including instructions stored thereon, which when executed by a machine, configure the machine to perform operations comprising:
exposing a light sensor for a specified time;
altering a focal point of a variable focus element situated in the light path of the light sensor from a first focal point to a second focal point in the specified time; and
processing an image of a barcode produced by the photo detector to deblur the image.

19. The storage medium of claim 18, further comprising instructions, which when executed by the machine, configure the machine to perform operations comprising determining a plurality of point spread functions, each point spread function associated with a different distance between the variable focus element and the barcode, and de-convolving the image a plurality of times, each time using a different point spread function of the plurality of point spread functions.

20. The storage medium of claim 19, further comprising instructions, which when executed by the machine, configure the machine to perform operations comprising determining which image of the plurality of de-convolved images is sharpest before decoding the image.

* * * * *